US005970189A

United States Patent [19]
Zehetner

[11] Patent Number: 5,970,189
[45] Date of Patent: Oct. 19, 1999

[54] OPTICAL ELEMENT

[75] Inventor: Helmut Zehetner, Gerasdorf, Austria

[73] Assignee: Photonic Optische Geräte Ges.m.b.H. & Co. KG, Vienna, Austria

[21] Appl. No.: 08/999,601

[22] Filed: Jan. 7, 1998

[30] Foreign Application Priority Data

Jan. 15, 1997 [AU] Australia .................................. A54/97

[51] Int. Cl.[6] ........................................................ G02B 6/32

[52] U.S. Cl. ............................ 385/33; 385/115; 385/117; 385/119; 385/901; 362/560; 362/554

[58] Field of Search ................................ 385/33, 31, 115, 385/117, 116, 118, 119, 120, 147, 901; 362/560, 554, 556

[56] References Cited

U.S. PATENT DOCUMENTS

| | | | |
|---|---|---|---|
| 5,036,834 | 8/1991 | Sugiyama et al. | 385/117 X |
| 5,491,765 | 2/1996 | Matsumoto | 385/33 |
| 5,675,677 | 10/1997 | Davenport et al. | 385/31 |

*Primary Examiner*—Phan T. H. Palmer
*Attorney, Agent, or Firm*—Martin A. Farber

[57] ABSTRACT

An optical element comprises zones of different refraction power or curvature in order to achieve a desired pattern of brightness distribution. In Particular, a darker spot in a central illumination region of an illuminating arrangement including a cold light reflector lamp the light of which is supplied over a fiber optic light guide should be avoided. The optical element has a rotational symmetric annular zone of low or no curvature the outer ring diameter of which being larger and the inner ring diameter being smaller than the diameter of the light exit surface of the fiber optic light guide. A second rotational symmetric zone has a stronger curvature than the first zone. This second zone is situated within the inner ring diameter of the first zone. Both zones face the light exit surface of the light guide. A third zone has a curvature different to the curvatures of the first and second zones, and is situated at the light exit side of the optical element. This third zone is opposite both to the second zone in a rotational symmetric manner and, at least in part, to the first zone in radial relationship.

6 Claims, 2 Drawing Sheets

| | Object field's diameter [in mm] | | | | | | | | | | | | |
|---|---|---|---|---|---|---|---|---|---|---|---|---|---|
| | -30 | -25 | -20 | -15 | -10 | -5 | 0 | 5 | 10 | 15 | 20 | 25 | 30 |
| without optical element E | 27 | 58 | 88 | 98 | 97 | 88 | 69 | 74 | 88 | 99 | 100 | 87 | 53 |
| weighted average above 40mm E | | | 93.4 | 93.4 | 93.4 | 93.4 | 93.4 | 93.4 | 93.4 | 93.4 | 93.4 | | |
| with an optical element E | 11 | 32 | 66 | 100 | 124 | 142 | 150 | 150 | 145 | 126 | 101 | 63 | 31 |
| weighted average above 40mm E | | | 109.3 | 109.3 | 109.3 | 109.3 | 109.3 | 109.3 | 109.3 | 109.3 | 109.3 | | |

OPTICAL ELEMENT

FIELD OF THE INVENTION

The present invention relates to an optical element comprising zones of different curvature in order to avoid reduced brightness in a central illumination region of an illuminating arrangement including a cold light reflector lamp or metal oxide vaporized mirror lamp, the light of which being supplied to a fiber optical light guide.

BACKGROUND OF THE INVENTION

Lamps of the above-mentioned type comprise a reflector through the central region of which the lamp's base is passing. The glass bulb of the lamp itself has a seal stud at its end remote from the reflector. This constructive arrangement affects, however, the emission characteristic of the lamp in a disadvantageous manner in that the light intensity is significantly smaller in the central region than in regions situated more off-side the optical axis. If light emitted from such a reflector lamp is guided to an object to be illuminated, for example, through a fiber optical light guide, the same distribution characteristic of light intensity will, in principle, appear at the exit surface of this light guide. The maximum solid angle of light emission at light's exit from the light guide will be limited precisely by the numerical aperture of the glass fiber.

The solid or special angle of light emission of reflector lamps described above amounts about to 70°, and glass fiber light guides of 3 mm, 5 mm or 8 mm are used, for example, to guide the light to the object to be illuminated. The dark central spot occurring due to the constructive design of the reflector lamp described above will appear at the exit of the light guide the more significantly, the smaller the active diameter of the bundle of the fiber optic light guide is. This disadvantageous effect is utterly spoiling, for instance, when illuminating an object to be examined by microscope. Such a brightness distribution is especially disadvantageous with light guides comprising fiber bundles which run in common on the light entrance side, but are separated at the light exit side, i.e. which are then divided into a plurality of light guides.

In order to avoid a dark central spot, it has already been suggested to arrange the reflector lamp inclined with respect to the axis of the light entrance surface of the light guide. This, however, results merely in a size reduction of the dark central spot. Even with an inclined lamp, the above-mentioned dark spot appears, some times due to tolerances in manufacture of the reflector lamp. Moreover, a special drawback will occur with small active diameters of the light guide, even with an inclined lamp, in that the improvement in brightness distribution in the central region of an illuminated surface is rather insignificant.

Furthermore, it has been suggested to arrange a wedge-like optical element in the region between the reflector lamp and the entrance surface of the light guide in order to avoid a dark central spot. Although this known suggestions results in an improvement in brightness distribution in the central region, the average light intensity over the surface to be illuminated will be reduced significantly by such a measure. The reason for this disadvantageous effect is that, although some light intensity is transferred into the central angular region by wedge-like elements, light is also directed concurrently to the light guide in an angular region which lies outside its numerical aperture and, therefore, cannot be transferred any further.

SUMMARY OF THE INVENTION

It is an object of the present invention to avoid the drawbacks of the prior art and, more particularly, to achieve an optimal distribution of brightness at an illuminated surface, especially by avoiding a dark spot in a central region of the illuminated surface. For in many applications, such as in microscopy, it is required to have light of at least the same brightness available within the central region of an illuminated surface as in more external regions of the illuminated surface.

Therefore, in accordance with the invention, an optical element of the kind described is suggested wherein this optical element comprises a first annular, rotational symmetric zone having a small or no curvature, the outer ring diameter of this zone being larger and its inner ring diameter being smaller than the diameter of the light exit surface of the fiber optic light guide; a second rotational symmetric zone of a stronger curvature than the curvature of the first zone, this second zone being situated within the inner ring diameter of the first zone and the two zones facing the exit surface of the light guide; and a third zone of a curvature different with respect to the curvatures of the first and second zones which is situated at the light exit side of the optical element, this third zone being arranged opposite both to the second zone in rotational symmetric relationship and, at least partially, to the first zone in radial relationship. By suitably selecting the dimensions of the zones and their curvatures, thickness' and diameters, it is achieved to transfer light from the angular regions of higher intensity to solid angular regions close to the axis at the light exit side after the optical element, on the one hand, and to reduce significantly the maximum solid angle of the light cone exiting the optical element, on the other hand. Thus, the radiation of the optical element is influenced in a favorable manner in such a way that a predetermined brightness distribution of the surface to be illuminated is achieved.

According to a preferred embodiment of the invention, it is suggested that the second zone forms a concave lens surface, and the third zone forms a convex lens surface. By such a combination of optically effective zones at both sides of the optical element, darkness in the central region, the so-called dark spot, will already be reduced by such a simple design of the optical element.

In order to be able to combine mechanically the optical element with an illuminating arrangement or the light guide, particularly in a predetermined position, it is suggested, according to another preferred embodiment, that a, preferably cylindrical, wall is provided at the outer edge of the optical element, outside the first zone, which extends in the direction of the rotational axis of the optical element and which tensionally and releasably embraces the light guide as a holder.

BRIEF DESCRIPTION OF THE DRAWINGS

An embodiment of the optical element according to the invention is represented in the drawings by way of example.

FIG. 2 depicts a plot of the brightness distribution achieved by an optical element according to the invention, whereas FIG. 3 shows a table of illumination measuring values.

DETAILED DESCRIPTION OF THE DRAWINGS

Figure 1:
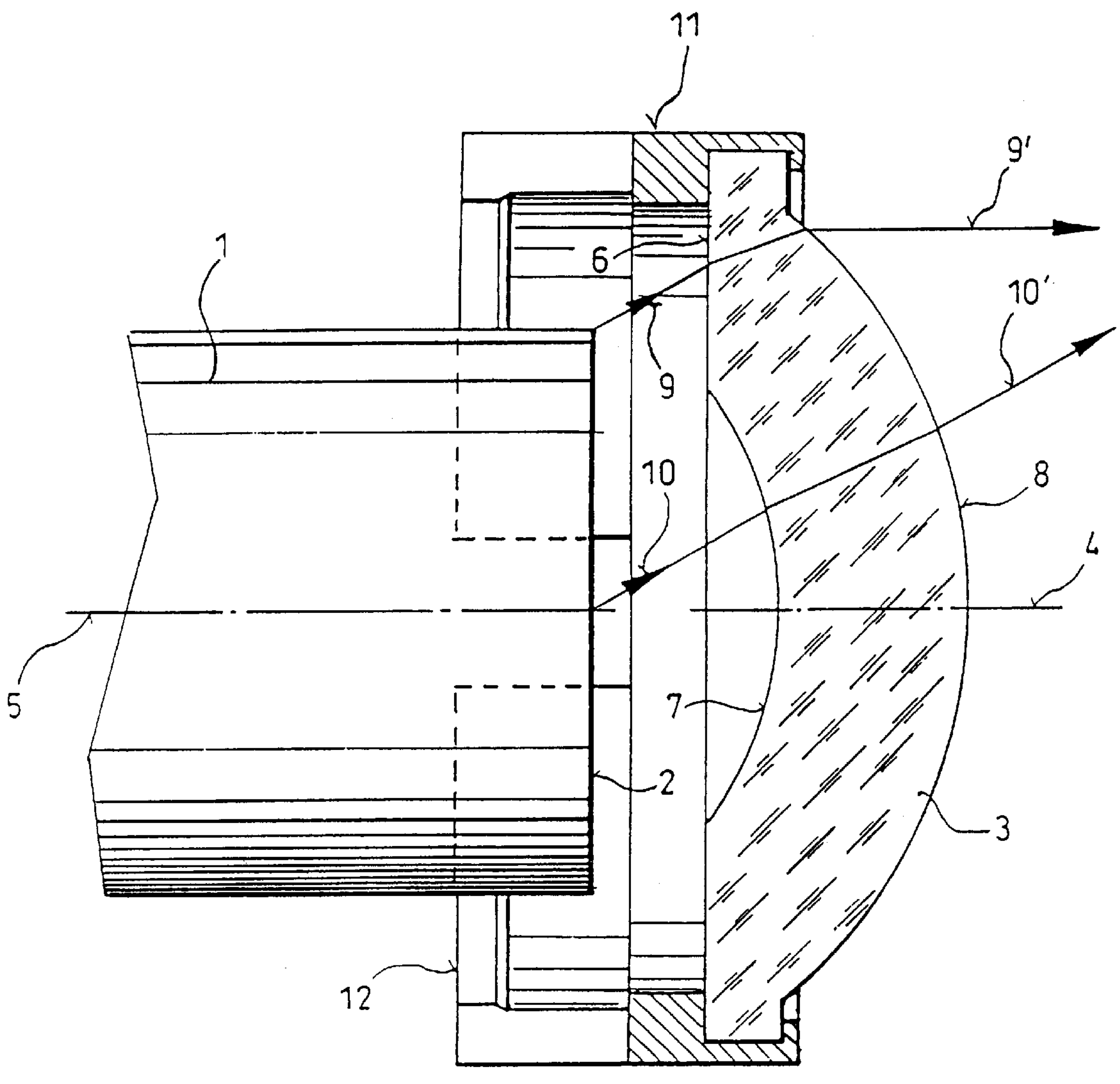
FIG. 1 illustrates a cross-sectional view of the optical element.

In FIG. 1, 1 designates a light guide which forms part of an illuminating arrangement not shown being, for example, equipped with a halogen cold light reflector lamp. Such a reflector lamp has a radiation characteristic which has a significantly lower light intensity in a central region as compared with the remaining regions. This is due to a seal stud of the lamp bulb and to the lamp's base passing through the reflecting mirror. Light emitted by the reflector lamp passes through the light guide 1 and is used, for example, for illuminating an object (not shown) to be viewed by a microscope. In principle, the same characteristic showing a non-uniform brightness distribution will result at the light guide's exit 2. The maximum solid angle of light emitted will be limited precisely by the numerical aperture of the glass fiber of the light guide.

A dark central spot within a field to be illuminated, due to the significantly lower light intensity in the central region, is the more clearly visible the smaller the active bundle diameter of the glass fibers of the light guide is. For illuminating the object field of a microscope, glass fiber light guides are used which have an active diameter of 3 to 8 millimeters only. Such a dark central spot will also appear if a fiber bundle of a light guide is subdivided into a plurality of fiber bundles, e.g. into two or three fiber bundles, for illuminating an object.

In order to avoid or to eliminate the central dark spot, an optical element 3, that faces the light exit side 2, is arranged within the path of rays of the fiber optic light guide 1.

The optical element 3 is formed as a rotational symmetric light dome of glass or light transmissive plastic material. The arrangement of the optical element 3 before the exit side 2 of the light guide 1 is such that the rotational axis 4 of the optical element 3 is perpendicular to the exit surface 2 of the light guide 1 and is aligned with the axis 5 of the light guide 1.

At the light entrance side of the optical element 3, there are two optically differently effective zones 6, 7, whereas at the light exit side of the optical element 3 a third optically effective zone 8 is provided. Thus, the zones 6, 7 and 8 constitute optically effective surfaces. At the light entrance side of the optical element 3, the zone 6 of the embodiment shown by way of example is an annular plane surface for marginal rays 9, 9' emitted from the light guide 1 of the illuminating arrangement. The marginal rays 9 leave the optical element 3 as marginal rays 9' over the curved and optically effective surface of the zone 8 at the light exit side of the optical element 3.

Thus, it will be recognized by those skilled in the art that by choosing an appropriate refractive power, i.e. curvature thickness, transmissive material etc., of the three zones, which, in general, will have different curvatures, a desired brightness distribution can be achieved. For by mathematically determining and dimensioning the curvatures, thickness' or diameters of the optical element 3, light is transferred from the angular regions of higher intensity towards those angular regions which are close to the axes 4 and 5 behind the optical element 3, as may be seen from the path of marginal rays 9 and 9'. In addition, by cooperation of the curved surface of zone 7 with that of zone 8, which is also curved, but generally with a different curvature, the maximum solid angle of the light cone emitted from the optical element will be significantly reduced, as may be seen from the path of inner rays 10 and 10'. From the path of exiting rays 9' and 10', it may also be clear that, just for the purpose of avoiding a dark central spot, it is convenient if the refractive power from the outer zone 6 towards the region of the rotational axes 4, 5 is decreasing.

Figures 2, 3:
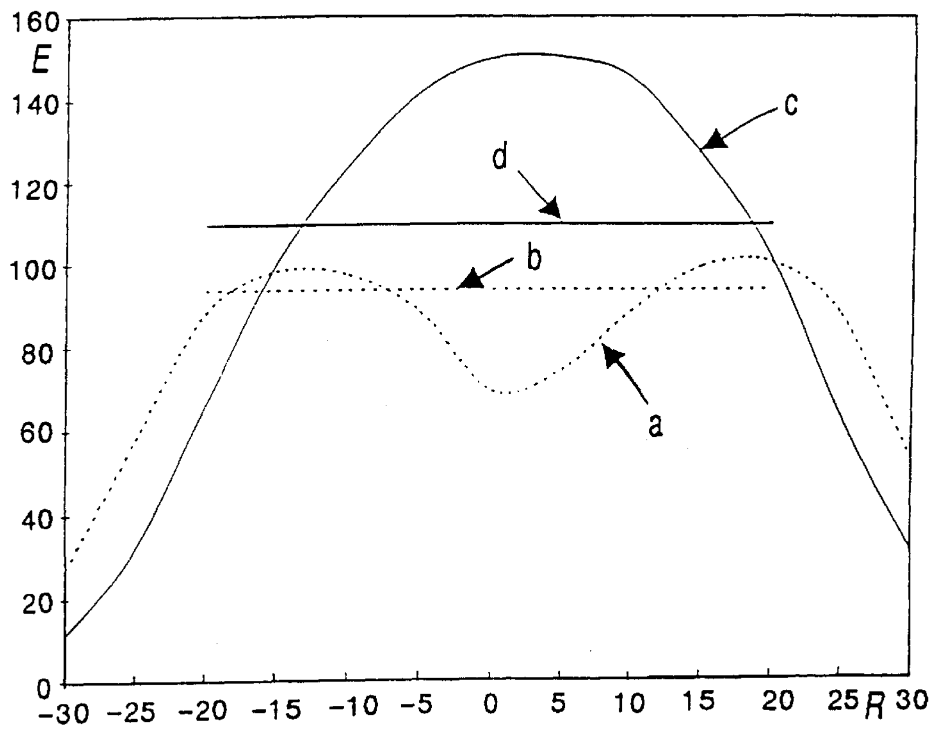

FIG. 2 shows a plot graphically illustrating the effect of the optical element 3 in comparison with light emitted by the light guide 1 without using an optical element 3 after it. In this diagram, the relative illumination measuring values E are shown as a curve in relation to the radii R of the illuminated object field. Therein, curve a illustrates the relative illumination measuring values without any optical element, curve b are the evaluated or weighted relative average value of illumination over 40 mm without any optical element, curve c the relative illumination measuring values when using the optical element 3, and curve d the evaluated or weighted relative average value of illumination over 40 mm when using the optical element 3.

These curves a to d are defined by the measuring values of illumination intensity listed in the table of FIG. 3. For carrying out these measurements, a light guide of an active diameter of 5 mm was used. The relative measurement of the illumination intensities was made in a distance of 60 mm. The light sensitive measuring surface of the photometer employed had a diameter of 2 mm. Measurements were carried out within a measuring region of a radius R=30 mm, the evaluation being made over a radius r=20 mm.

From the diagram according to FIG. 2 and its curve a, the central dark region, appearing when no optical element 3 is used, is clearly visible. If the optical element 3 is arranged in the manner shown in FIG. 1, curve c shows clearly that the central dark region does no longer exist. In addition, the weighted average value of illumination intensity is, in accordance with curve d, substantially higher than without having arranged an optical element 3 (curve b).

The invention is not limited to the above described embodiment. For example, it may be suitable in dependence on the light emission characteristic of a respective lamp or at the exit side of the light guide 1 to modify the optically effective zones of the element 3. Thus, it may be convenient to provide more than two optically differently effective zones either at the light entrance side of the optical element 3 and/or at the light exit side of the optical element 3. Instead of an annular plane surface of zone 6, a curved surface may be provided also in this region in order to change an emission characteristic to comply with a special object or task.

Furthermore, a continuous or a discontinuous transition of adjacent optically effective zones may be chosen in accordance with the brightness distribution requested for an illuminated object field. In this respect, the upper part of FIG. 1 shows a discontinuous, i.e. sudden, transition from zone 7 to zone 6, while the lower part shows a continuous or gradual transition 7'. It is clear that such continuous or discontinuous transitions can also be provided at the light exit side of the optical element 3 provided there are more than one zone 8 on this side.

In order to connect the optical element 3 to the light guide 1, cylindrical wall portions 11 may, for example, be provided at the outer edge of the optical element 3, preferably being integral with the material of the optical element 3, which extends in the direction of the rotational axes 4, 5, and which enables putting the optical element 3 onto the light guide 1 or a mount 12 thereof in a socket-like manner. At the inner surface of wall portions 11, one or more notches or the like for engagement with respective grooves in the mount 12 may be provided which enable fixed, but releasable fastening of the optical element 3 to the light guide 1 or its mount 12 in at least one predetermined distance. It is clear that instead of these crown-like individual wall portions strips 11, preferably angularly uniformly distributed over the periphery of the optical element 3, a substantially cylindrical wall, may extend parallel to the axes 4, 5. The advantage of individual strips, however, is that they provide a springy, resilient engagement with the mount 12.

The optical element 3 may also be made of colored or stained glass or other transmissive material if the use of colored light is requested for some application in microscopy material investigation or the like. Instead of shaping the optical element 3 as a dome, any other suitable structure and shape may be chosen. The optical element according to the invention may be used to achieve any distribution of light intensity desired and is not restricted to avoiding a dark central spot.

Optical elements, mainly when made of plastic material, may be produced by injection molding in a simple way in which case aspherically curved zones may easily be provided.

What is claimed is:

1. An optical element for achieving a predetermined distribution of brightness in a field to be illuminated by an illuminating arrangement including a fiber optic light guide having a light exit surface of predetermined diameter facing said optical element which comprises an outer edge, a light entrance side, a light exit side, a first annular, rotational symmetric zone defined by an outer ring diameter and an inner ring diameter, wherein said outer ring diameter is larger and said inner ring diameter is smaller than said predetermined diameter;

a second rotational symmetric zone situated within said inner ring diameter;

said first and second zones facing said light exit surface, said second zone being curved more than said first zone; and a third zone having a curvature different from that of said first and second zones, said third zone being situated at said light exit side and opposite both to said second zone in rotational symmetric relationship and, at least partially, to said first zone in radial relationship.

2. Optical element as claimed in claim 1, further comprising wall means surrounding said outer edge outside said zones, said wall means extending in the direction of said axis to form a connection to said illuminating arrangement.

3. Optical element as claimed in claim 2, wherein said wall means embrace said illuminating arrangement tensionally and releasably.

4. Optical element as claimed in claim 3, wherein said wall means consist of individual resilient strips which extend in the direction of said axis.

5. Optical element as claimed in claim 2, wherein said wall means are cylindrical.

6. Optical element as claimed in claim 1, wherein said second zone is formed by a concave lens surface, while said third zone is formed by a convex lens surface.

* * * * *